United States Patent
Wu et al.

(10) Patent No.: US 12,163,863 B2
(45) Date of Patent: Dec. 10, 2024

(54) DETECTION SYSTEM FOR SUSPENSION SYSTEM OF MAGLEV TRAIN

(71) Applicant: CRRC QINGDAO SIFANG CO., LTD., Shandong (CN)

(72) Inventors: Donghua Wu, Shandong (CN); Xin Miao, Shandong (CN); Yanmin Li, Shandong (CN); Shouliang Jiang, Shandong (CN); Jian Chen, Shandong (CN); Jiyu Han, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 0 days.

(21) Appl. No.: 18/557,936

(22) PCT Filed: Apr. 27, 2022

(86) PCT No.: PCT/CN2022/089500
§ 371 (c)(1),
(2) Date: Oct. 29, 2023

(87) PCT Pub. No.: WO2022/228453
PCT Pub. Date: Nov. 3, 2022

(65) Prior Publication Data
US 2024/0230475 A1   Jul. 11, 2024

(30) Foreign Application Priority Data

Apr. 30, 2021   (CN) .......................... 202110486046.9

(51) Int. Cl.
*G01M 17/10* (2006.01)
*B60L 13/08* (2006.01)
*B61B 13/08* (2006.01)

(52) U.S. Cl.
CPC ............. *G01M 17/10* (2013.01); *B60L 13/08* (2013.01); *B61B 13/08* (2013.01); *B60L 2200/26* (2013.01)

(58) Field of Classification Search
CPC ...... B60L 13/08; B60L 2200/26; B61B 13/08; G01M 17/10
See application file for complete search history.

(56) References Cited

FOREIGN PATENT DOCUMENTS

| CN | 101441136 A | 5/2009 |
|---|---|---|
| CN | 102252815 A | 11/2011 |

(Continued)

OTHER PUBLICATIONS

International Search Report for PCT/CN2022/089500 mailed Jul. 19, 2020, ISA/CN.

(Continued)

*Primary Examiner* — Robert J McCarry, Jr.
(74) *Attorney, Agent, or Firm* — Yue (Robert) Xu; Apex Attorneys at Law, LLP (57) ABSTRACT

A detection system for a suspension system of a maglev train, comprising a detection component and a controller. The detection component comprises: a driving unit, a first test coil unit and a second test coil unit. A first test coil group of the first test coil unit corresponds to a gap coil of a to-be-detected suspension sensor, and a second test coil group of the second test coil unit corresponds to a speed coil of the to-be-detected suspension sensor. The controller is communicatively connected with the driving unit and a suspension controller, the driving unit is configured to send a driving signal to at least one of the first test coil unit and the second test coil unit in response to a control command from the controller, and the controller is configured to acquire parameter information fed back by the suspension controller.

10 Claims, 5 Drawing Sheets

(56) References Cited

FOREIGN PATENT DOCUMENTS

| CN | 104990717 | A |   | 10/2015 | |
|---|---|---|---|---|---|
| CN | 105301286 | A |   | 2/2016 | |
| CN | 205049167 | U |   | 2/2016 | |
| CN | 106645912 | A |   | 5/2017 | |
| CN | 209295901 | U |   | 8/2019 | |
| CN | 209589119 | U |   | 11/2019 | |
| CN | 111207663 | A |   | 5/2020 | |
| CN | 111693772 | A | * | 9/2020 | ............... G01B 7/02 |
| CN | 211955547 | U | * | 11/2020 | .............. G01P 21/02 |
| CN | 112629397 | A |   | 4/2021 | |
| CN | 113092143 | A |   | 7/2021 | |
| JP | 2001174368 | A |   | 6/2001 | |
| KR | 100786601 | B1 |   | 12/2007 | |
| WO | 2006028317 | A1 |   | 3/2006 | |

OTHER PUBLICATIONS

Wu, Donghua etc., Analysis of Influence of Step-changing Method on Propulsion Characteristics of High-speed Maglev Vehicle, Electric Drive for Locomotives No. 6, 2020 (Nov. 10, 2020).
The European search report issued on Aug. 23, 2024 for EP22794923.7.

* cited by examiner

DETECTION SYSTEM FOR SUSPENSION SYSTEM OF MAGLEV TRAIN

CROSS REFERENCE OF RELATED APPLICATION

This application is the national phase of International Application No. PCT/CN2022/089500, titled "DETECTION SYSTEM FOR SUSPENSION SYSTEM OF MAGLEV TRAIN", filed on Apr. 27, 2022, which claims the priority to Chinese Patent Application No. 202110486046.9, titled "DETECTION SYSTEM FOR SUSPENSION SYSTEM OF MAGLEV TRAIN", filed on Apr. 30, 2021 with the China National Intellectual Property Administration, both of which are incorporated herein by reference in their entireties.

FIELD

The present disclosure relates to the technical field of maglev train detection, and in particular to a system for detecting a suspension system of a maglev train.

BACKGROUND

When a maglev train is suspended on a stator structure and traveling on a rail, a suspension system of the maglev train detects a gap between the train and the stator structure through a suspension sensor based on the inductor principle, and acquires a traveling speed of the train based on the number of teeth and slots of the stator structure which the train passes through for a time period. A suspension controller receives a gap signal and a speed signal acquired by the suspension sensor, and adjusts a driving current of an electromagnet in real time in response to the gap signal and the speed signal, to achieve the stable suspension control of the train. The suspension system is a crucial component in the maglev train.

In order to verify the function and performance of the suspension system, a specialized equipment is required to test the suspension controller and the suspension sensor.

According to the conventional detection method for the suspension system, a dedicated test bench is built, the suspension controller is connected to the suspension sensor and the electromagnet, the suspension sensor is installed on the electromagnet, the electromagnet and the stator structure are installed on the test bench. By setting a suspension gap, the actual fluctuation of the electromagnet is achieved, and a performance of the suspension system is debugged and tested.

In the above method, the cost of the test bench is high, and the size of the test bench is large. In addition, the electromagnet cannot move laterally, and only static performance of the suspension system can be tested. After components of the suspension system are installed on the train, the test bench cannot test the components or perform fault detection on the components. If the components are disassembled from the train for re-detection, the steps of disassembly are complex, which affects the detection efficiency and is not conducive to the troubleshooting of a current train.

In view of this, it is a technical problem to be solved currently by those skilled in the art to provide a system for detecting a suspension system that is used to achieve the commissioning, detection and troubleshooting of the suspension system of the current train to avoid the cost for building the specialized test bench and improve the detection efficiency.

SUMMARY

A system for detecting a suspension system of a maglev train is provided according to the present disclosure. The system is used to achieve the commissioning, detection, fault simulation and troubleshooting of the suspension system of a current train, to avoid building a specialized test bench, and greatly reduce the detection cost and improve the detection efficiency.

To solve the above technical problems, a system for detecting a suspension system of a maglev train is provided according to the present disclosure.

The system includes a detection component and a controller. The detection component includes a driving unit, a first test coil unit and a second test coil unit. A first test coil group of the first test coil unit corresponds to a gap coil of a to-be-detected suspension sensor in terms of number, position and dimension, and a second test coil group of the second test coil unit corresponds to a speed coil of the to-be-detected suspension sensor in terms of number, position and dimension. The first test coil group and the second test coil group each includes at least one coil. The controller is communicatively connected with the driving unit and a suspension controller. The driving unit is configured to send a driving signal to at least one of the first test coil unit and the second test coil unit in response to a control command from the controller. The controller is configured to acquire parameter information fed back by the suspension controller.

The system for detecting a suspension system according to the present disclosure is used to detect the suspension system of the maglev train. Multiple gap values and multiple speed values when the maglev train is traveling are simulated by applying an external magnetic field change environment for the to-be-detected suspension sensor. Based on values detected by the suspension controller of the suspension system in different simulated operating conditions, the suspension system is commissioned and detected, and fault simulation and troubleshooting can be achieved. The detection is performed on the current train, to avoid the cost for building a test bench, and improve the detection efficiency. In addition, the system for detecting the suspension system has small volume and is portable.

According to the system for detecting a suspension system of a maglev train described above, the number of the first test coil group included in the first test coil unit is two, and the first test coil group includes more than two coils that are independent from each other.

According to the system for detecting a suspension system of a maglev train described above, the number of the second test coil group included in the second test coil unit is two, and the second test coil group includes more than two coils that are independent from each other.

According to the system for detecting a suspension system of a maglev train described above, the first test coil unit and the second test coil unit are arranged on a circuit board, and the first test coil unit and the second test coil unit are arranged in different planes of the circuit board.

According to the system for detecting a suspension system of a maglev train described above, the detection component further includes a housing, the housing has a same shape as the to-be-detected suspension sensor, and the driving unit, the first test coil unit and the second test coil unit are arranged in the housing.

According to the system for detecting a suspension system of a maglev train described above, the housing includes a housing portion corresponding to a detection surface of the to-be-detected suspension sensor, a length direction of a coil of the first test coil group is the same as a width direction of the housing portion, and a length direction of a coil of the second test coil group is the same as a length direction of the housing portion.

According to the system for detecting a suspension system of a maglev train described above, the detection component further includes a wireless communication module, the driving unit communicates with the controller through the wireless communication module, and the wireless communication module is built-in to the housing.

According to the system for detecting a suspension system of a maglev train described above, the detection component further includes a power supply module built-in to the housing, and the power supply module is configured to supply power to the detection component.

According to the system for detecting a suspension system of a maglev train described above, the number of the detection component is more than one, and the multiple detection components are respectively arranged on multiple to-be-detected suspension sensors, and each of the multiple detection components communicates with the controller.

According to the system for detecting a suspension system of a maglev train described above, the parameter information includes a gap value and a speed value of the to-be-detected suspension sensor, and a current value of a to-be-detected electromagnet, and the driving signal includes an energized/de-energized state, an energized/de-energized frequency, an energized/de-energized sequence, and an energized/de-energized number of coils in the first test coil unit and the second test coil unit.

Reference numerals in the drawings are listed as follows:

| 01 | suspension sensor; | 011 | detection surface |
| 02 | suspension controller; | 10 | controller; |
| 20 | detection component; | 21 | driving unit; |
| 22 | first test coil unit; | 221 | first test coil group; |
| 23 | second test coil unit; | 231 | second test coil group; |
| 24 | housing; | 241 | housing portion; |
| 25 | wireless communication module | 26 | battery |

DETAILED DESCRIPTION OF EMBODIMENTS

In order to enable those skilled in the art to better understand the solutions according to the present disclosure, the following will provide further detailed explanations of the present disclosure in conjunction with the accompanying drawings and specific implementation methods.

Figure 1:
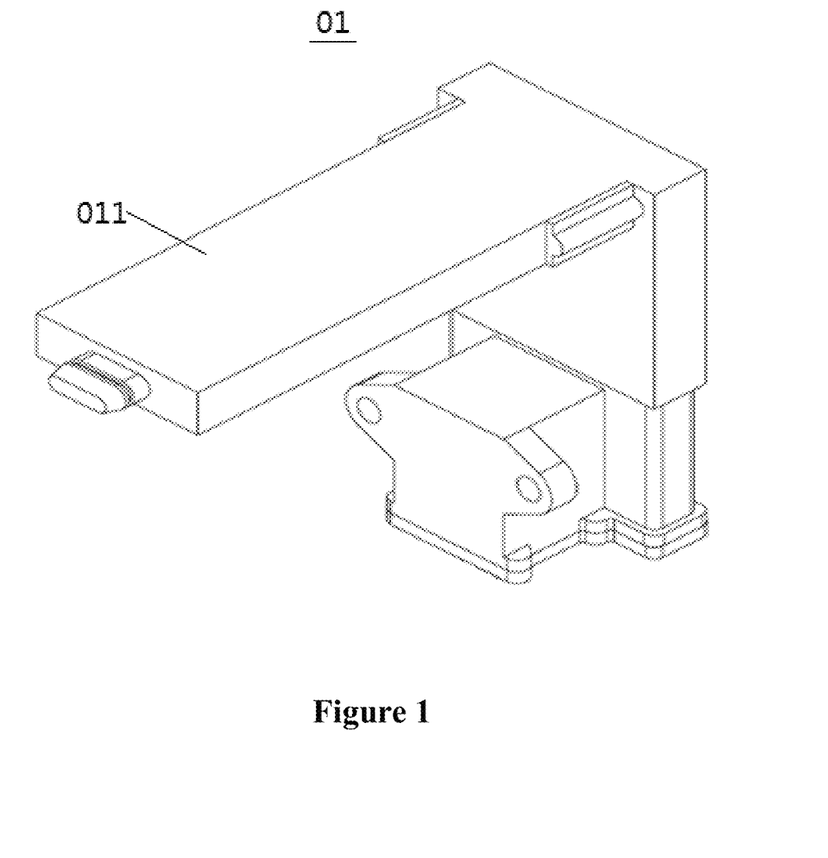
FIG. 1 is a schematic structural diagram showing a to-be-detected suspension sensor according to an embodiment of the present disclosure.
Figure 2:
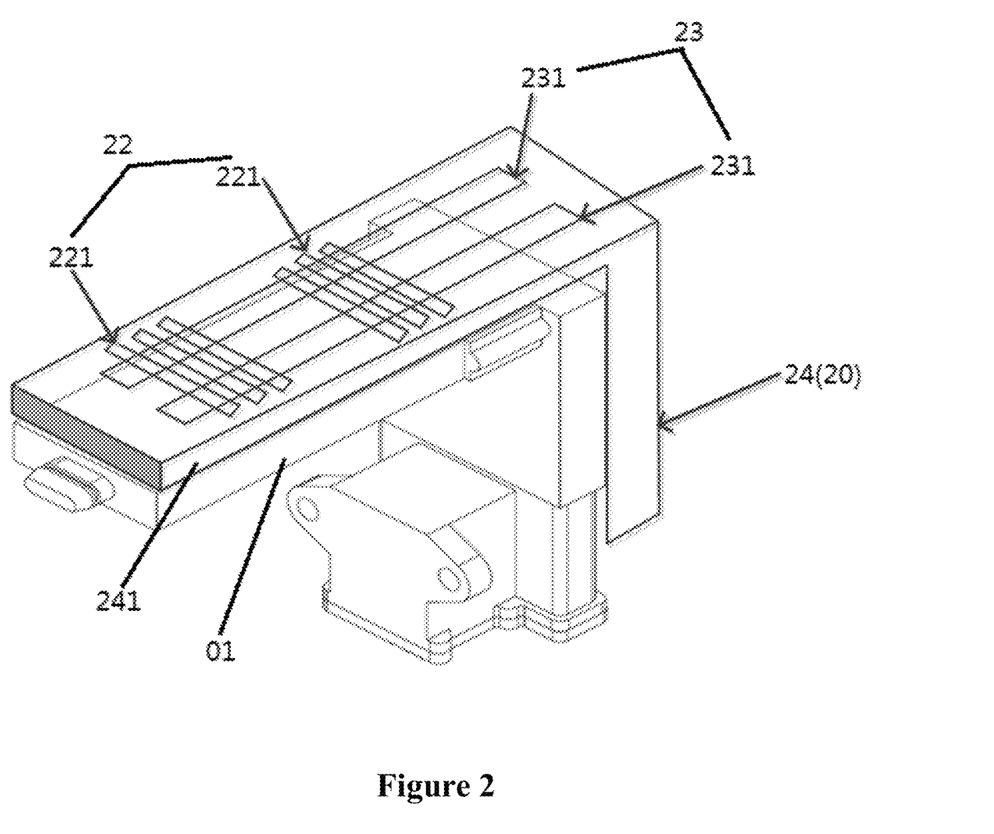
FIG. 2 is a schematic structural diagram showing that a detection component of a system for detecting a suspension system is installed on a to-be-detected suspension sensor according to an embodiment of the present disclosure.
Figure 3:
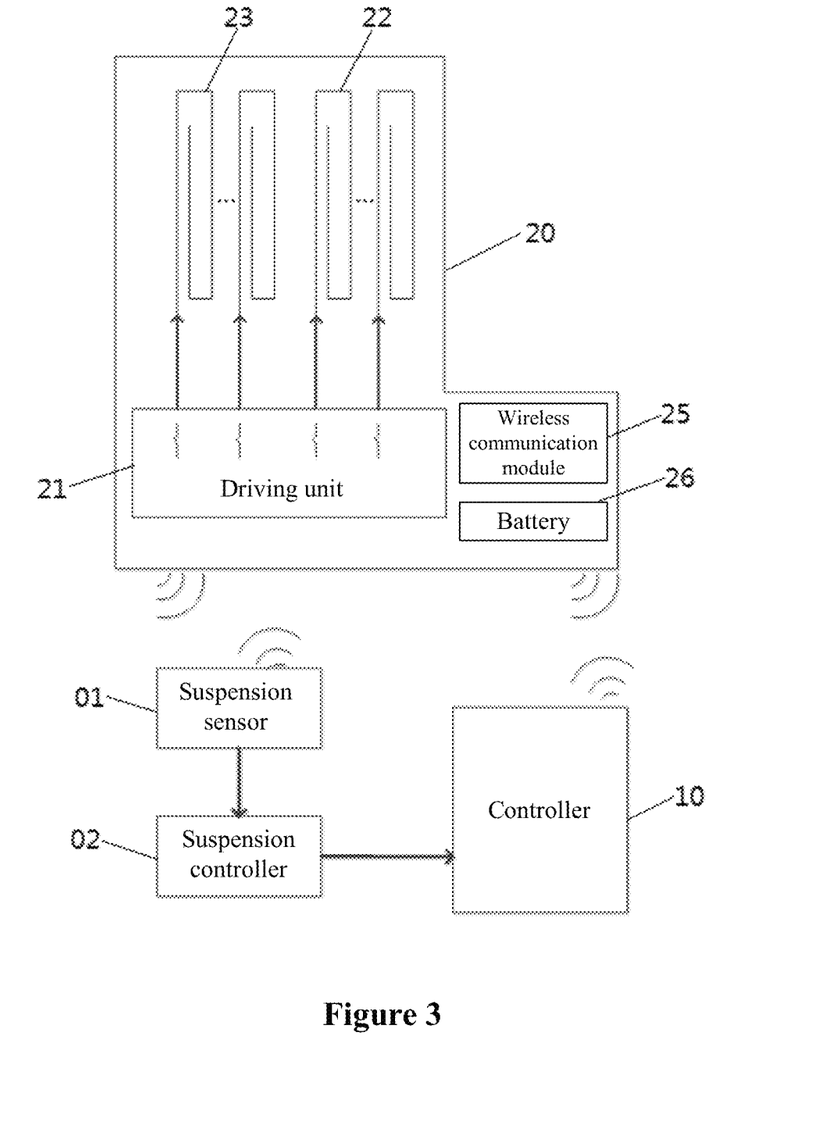
FIG. 3 is a schematic block diagram showing a system for detecting a suspension system according to an embodiment of the present disclosure.
Figure 4:
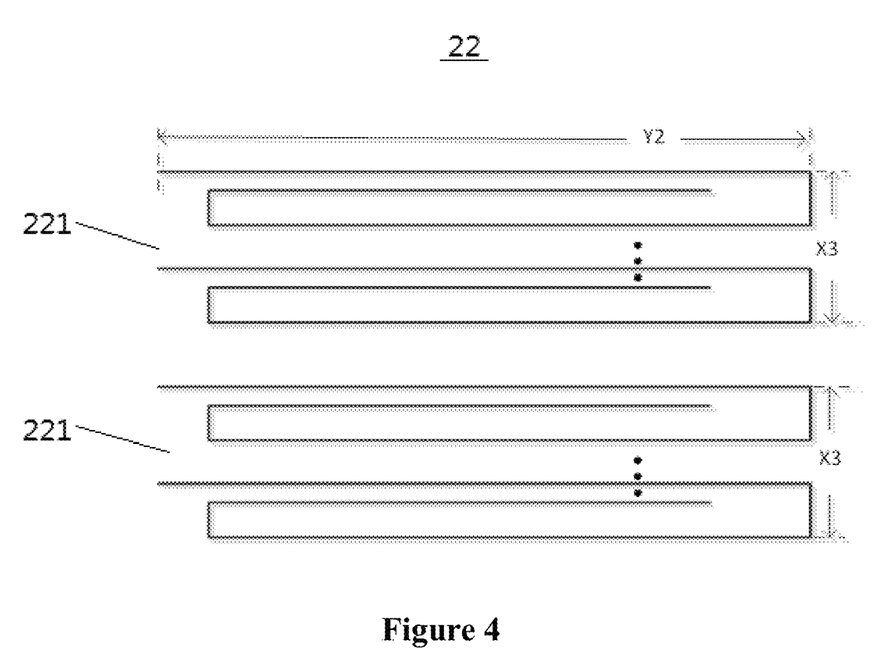
FIG. 4 is a schematic diagram showing a layout of a first test coil unit of a system for detecting a suspension system according to an embodiment of the present disclosure.
Figure 5:
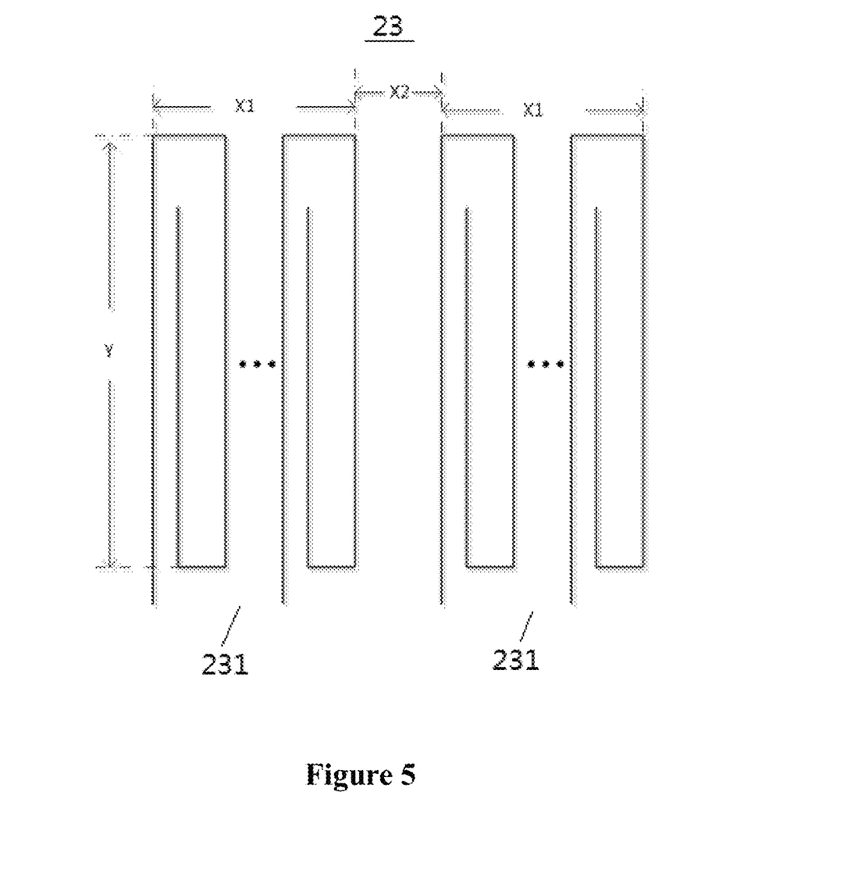
FIG. 5 is a schematic diagram showing a layout of a second test coil unit of a system for detecting a suspension system according to an embodiment of the present disclosure.

Reference is made to FIGS. 1 to 5. FIG. 1 is a schematic structural diagram showing a to-be-detected suspension sensor according to an embodiment of the present disclosure. FIG. 2 is a schematic structural diagram showing that a detection component of a system for detecting a suspension system is installed on a to-be-detected suspension sensor according to an embodiment the present disclosure. FIG. 3 is a schematic block diagram showing a system for detecting a suspension system according to an embodiment the present disclosure. FIG. 4 is a schematic diagram showing a layout of a first test coil unit of a system for detecting a suspension system according to an embodiment of the present disclosure. FIG. 5 is a schematic diagram showing a layout of a second test coil unit of a system for detecting a suspension system according to an embodiment of the present disclosure.

A system for detecting a suspension system of a maglev train is provided according to an embodiment. The system for detecting the suspension system of the maglev train includes a suspension sensor 01, a suspension controller 02 and an electromagnet (not shown in Figure). The suspension sensor 01 is installed on the electromagnet. The suspension controller 02 is connected to the suspension sensor 01 and the electromagnet, and is configured to acquire parameter information of the suspension sensor 01 and the electromagnet.

The system for detecting the suspension system of the maglev train according to the embodiment includes a controller 10 and a detection component 20. The controller 10 is communicatively connected to the suspension controller 02 and the detection component 20.

The detection component 20 includes a driving unit 21, a first test coil unit 22 and a second test coil unit 23.

A first test coil group 221 of the first test coil unit 22 corresponds to a gap coil of a to-be-detected suspension sensor 01 in terms of number, position and dimension, that is, the number of the gap coil of the to-be-detected suspension sensor 01 is the same as the number of the first test coil group 221 of the first test coil unit 22, a position of each first test coil group 221 spatially corresponds to a position of a gap coil of the to-be-detected suspension sensor 01 corresponding to the first test coil group 221, and a dimension of the gap coil of the to-be-detected suspension sensor 01 is the same as a dimension of the first test coil group 221 of the first test coil unit 22. Each first test coil group 221 includes at least one coil. The first test coil unit 22 is configured to simulate an external magnetic field for the suspension sensor 01. Multiple gap values may be simulated by controlling the coil in each first test coil group 221. It can be understood that in order to better detect the suspension system, the first test coil unit 22 is arranged to meet that the gap value of the suspension sensor 01 changes in a full-range of a gap channel. In an embodiment, the gap value ranges from 0 mm to 20 mm.

In the current applications, the suspension sensor 01 normally includes two gap coils, and the two gap coils are referred to as a channel A gap coil and a channel B gap coil in the industry. In the present disclosure, the first test coil unit 22 shown in Figures also includes two first test coil groups 221, and the two first test coil groups 221 respectively correspond to the channel A gap coil and the channel B gap coil. It can be understood that in the actual applications, the arrangement of the first test coil groups 221 of the first test coil unit 22 of the detection component 20 changes with the arrangement of the gap coils of the to-be-detected suspension sensor 01, which is not illustrated in detail herein.

A second test coil group 231 of the second test coil unit 23 corresponds to a speed coil of the to-be-detected suspension sensor 01 in terms of number, position and dimension, that is, the number of the speed coil of the to-be-detected suspension sensor 01 is the same as the number of the second test coil group 231 of the second test coil unit 23, a position of each second test coil group 231 spatially corresponds to a position of a speed coil of the to-be-detected suspension sensor 01 corresponding to the second test coil group 231, and a dimension of the speed coil of the to-be-detected suspension sensor 01 is the same as a dimension of the second test coil group 231 of the second test coil unit 23. Each second test coil group 221 includes at least one coil. The second test coil unit 23 is configured to simulate a change of an inductor, so that the speed coil in the to-be-detected suspension sensor 01 may equivalently identify a horizontal movement of a teeth-and-slot structure of a long stator, so as to measure a speed. That is, a required speed value may be simulated by controlling the coil in each second test coil group 231 of the second test coil unit 23. The setting of the second test coil unit 23 is related to a range of the required speed value. In an embodiment, the simulated speed value ranges from 0 to 600 Km/h.

In the current applications, the suspension sensor 01 normally includes two speed coils. In the present disclosure, the second test coil unit 23 shown in Figures also includes two second test coil groups 231, and the two second test coil groups 231 respectively correspond to the two speed coils. It can be understood that in the actual applications, the arrangement of the second test coil groups 231 of the second test coil unit 23 of the detection component 20 changes with the arrangement of the speed coils of the to-be-detected suspension sensor 01, which is not illustrated in detail herein.

The first test coil group 221 and the second test coil group 231 each includes at least one coil.

The driving unit 21 of the detection component 20 is configured to send a driving signal to at least one of the first test coil unit 22 and the second test coil unit 23 in response to a control command from the controller 10. In other words, multiple gap values are simulated by the driving unit 21 controlling the coil in each first test coil group 221 of the first test coil unit 22, and multiple speed values are simulated by the driving unit 21 controlling the coil in each second test coil group 231 of the second test coil unit 23.

The driving unit 21 is communicatively connected to the first test coil unit 22 and the second test coil unit 23.

The controller 10 is further configured to acquire parameter information fed back by the suspension controller 02.

As described above, in the system for detecting the suspension system of the maglev train, the detection component 20 may be installed on the to-be-detected suspension sensor 01, the first test coil unit 22 and the second test coil unit 23 of the detection component 20 respectively correspond to the gap coil and the speed coil of the suspension sensor 01, the controller 10 sends the control command to the driving unit 21, and the driving unit 21 generates the driving signal in response to the control command and sends the driving signal to the first test coil unit 22 and the second test coil unit 23, to simulate the gap value and the speed value when the train is traveling. The suspension controller 02 receives and processes a gap signal and a speed signal acquired by the suspension sensor 01, so as to adjust a driving current of the electromagnet. In this process, the controller 10 acquires parameter information fed back by the suspension controller 02, so as to detect and commission the suspension system. In addition, a fault may be simulated by controlling the first test coil unit 22 and the second test coil unit 23, and troubleshoot is further performed on the current train based on a detection result, thereby avoiding the cost for building the test bench in the conventional technology. The detection method is performed on the current train, the detection efficiency can be improved, and the system for detecting the suspension system of the maglev train has small volume and is portable.

In the actual applications, the number of multiple detection components 20 may be set to be the same as the number of to-be-detected suspension sensors 01. The multiple detection components 20 may communicate with the controller 10. The controller 10 sends different control commands to the multiple detection components 20, to meet different detection requirements.

In an embodiment, the first test coil group 221 in the first test coil unit 22 includes more than two coils, and the more than two coils are independent from each other, that is, the driving unit 21 may control the more than two coils in the first test coil group 221 to be energized separately, so that the coils does not affect each other.

As shown in FIG. 4, for each of the first test coil groups 221, the first test coil group 221 includes multiple coils, and a width X3 and a length Y2 of the first test coil group 221 are respectively the same as a width and a length of a gap coil of the suspension sensor 01 corresponding to the first test coil group 221. A space interval between the two first test coil groups 221 is the same as a space interval between two gap coils of the suspension sensor 01.

The second test coil group 231 of the second test coil unit 23 includes more than two coils, and the more than two coils are independent from each other, that is, the driving unit 21 may control the more than two coils in the second test coil group 231 to be energized separately, so that the coils does not affect each other.

As shown in FIG. 5, for each of the second test coil groups 231, the second test coil group 231 includes multiple coils, and a width X1 and a length Y of the second test coil group 231 are respectively the same as a width and a length of a speed coil of the suspension sensor 01 corresponding to the second test coil group 231. A space interval between the two second test coil groups 231 is the same as a space interval between two speed coils of the suspension sensor 01.

Based on the above, the driving signal sent by the driving unit 21 includes: an energized/de-energized state and an energized/de-energized frequency for each coil of the test coil groups, an energized/de-energized sequence of coils in the test coil group, and the number of energized/de-energized coils in the test coil group, depending on the requirements of an operating condition during the actual detection.

In an embodiment, the parameter information fed back by the suspension controller 02 includes: the gap value and the speed value of the suspension sensor, and the current value of the electromagnet.

In an embodiment, the first test coil unit 22 and the second test coil unit 23 may be arranged on a circuit board, and the first test coil unit 22 and the second test coil unit 23 are arranged in different planes of the circuit board, to avoid that the first test coil unit 22 and the second test coil unit 23 affect each other. In addition, the driving unit 21 may be a driving control circuit, and the driving unit 21 may be arranged on the same circuit board as the first test coil unit 22 and the second test coil unit 23, or arranged on a circuit board different from the circuit board where the first test coil unit 22 and the second test coil unit 23 are arranged.

The driving unit 21 may drive a logic switching device or a relay to generate a driving signal through the control circuit.

It can be understood that the first test coil unit 22 may be arranged on a circuit board, and the second test coil unit 23 may be arranged on another circuit board.

As shown in FIG. 1, the suspension sensor 01 normally has a detection surface, and is in an L-shaped overall structure. In practices, the detection component 20 is provided with a housing 24. The housing 24 has a same shape as the suspension sensor 01, to facilitate the arrangement of the housing 24 on the suspension sensor 01. Both the driving unit 21, the first test coil unit 22 and the second test coil unit 23 are arranged in the housing 24. In this way, all components in the detection component 20 are integrated in the housing 24, to facilitate installation.

As shown in FIG. 2, the housing 24 includes a housing portion 241 corresponding to the detection surface 011 of the suspension sensor 01. After the installation, the housing portion 241 is arranged on the detection surface 011 of the suspension sensor 01, and the first test coil unit 22 and the second test coil unit 23 are arranged in the housing portion 241. A length direction of each coil in the first test coil groups 221 of the first test coil unit 22 is the same as a width direction of the housing portion 241, that is, the length direction of the coil is the same as a width direction of the detection surface 011 of the suspension sensor 01. A length direction of each coil in the second test coil groups 231 of the second test coil unit 23 is the same as a length direction of the housing portion 241, that is, the length direction of the coil is the same as a length direction of the detection surface of the suspension sensor 01. The foregoing is related to the arrangement directions of the gap coil and the speed coil in the suspension sensor 01.

In order to facilitate installation and detection, the detection component 20 further includes a wireless communication module 25 arranged in the housing 24. The driving unit 21 communicates with the controller 10 through the wireless communication module 25.

In order to supply power for the detection component 20 and the endurance of devices, the detection component 20 is further provided with a power supply module arranged in the housing 24. The power supply module may be a battery 26, or an existing power supply.

In the actual applications, the detection component 20 is prepared according to the number of the to-be-detected suspension sensor 01, and the detection component 20 is arranged on the to-be-detected suspension sensor 01. The commissioning worker may control the controller 10 to send a control command to the driving unit 21 of the detection component 20, and the driving unit 21 generates the driving signal in response to the control command. By simulating a full gap range and a full speed range, the suspension controller 02 is detected based on a gap value, a speed value, a current value and other parameters fed back by the suspension controller 02 at different gap values, and different speed values. In addition, a case that one or more suspension sensors 01 acquire an abnormal speed (that is too fast or too slow) or abnormal gap (that is too large or too small) is simulated, to monitor response ability or logic processing of the suspension controller 02, so as to determine an operation state of the suspension controller 02, achieving the closed-loop detection of the suspension system.

The system for detecting a suspension system of a maglev train according to the present disclosure is described in detail above. Specific examples are used in the present disclosure to illustrate the principle and implementation of the present disclosure. The description of the above embodiments is only used to facilitate understanding of the method and core concept of the present disclosure. It should be noted that, for those skilled in the art, many improvements and modifications may be further made to the present disclosure without departing from the principle of the present disclosure, and these improvements and modifications also fall within the protection scope of claims of the present disclosure.

The invention claimed is:

1. A system for detecting a suspension system of a maglev train, comprising: a detection component and a controller, wherein
the detection component comprises: a driving unit, a first test coil unit and a second test coil unit;
a first test coil group of the first test coil unit corresponds to a gap coil of a to-be-detected suspension sensor in terms of number, position and dimension;
a second test coil group of the second test coil unit corresponds to a speed coil of the to-be-detected suspension sensor in terms of number, position and dimension;
the first test coil group and the second test coil group each comprise at least one coil;
the controller is communicatively connected with the driving unit and a suspension controller;
the driving unit is configured to send a driving signal to at least one of the first test coil unit and the second test coil unit in response to a control command from the controller;
the controller is configured to acquire parameter information fed back by the suspension controller;
the first test coil unit and the second test coil unit are arranged on a circuit board, and the first test coil unit and the second test coil unit are arranged in different planes of the circuit board; and
wherein the detection component further comprises a housing, the housing has a same shape as the to-be-detected suspension sensor, and the driving unit, the first test coil unit and the second test coil unit are arranged in the housing.

2. The system for detecting a suspension system of a maglev train according to claim 1, wherein the number of the first test coil group comprised in the first test coil unit is two, and the first test coil group comprises more than two coils that are independent from each other.

3. The system for detecting a suspension system of a maglev train according to claim 2, wherein the number of the detection component is more than one, and a plurality of detection components are respectively arranged on a plurality of to-be-detected suspension sensors, and each of the plurality of detection components communicates with the controller.

4. The system for detecting a suspension system of a maglev train according to claim 1, wherein the number of the second test coil group comprised in the second test coil unit is two, and the second test coil group comprises more than two coils that are independent from each other.

5. The system for detecting a suspension system of a maglev train according to claim 4, wherein the number of the detection component is more than one, and a plurality of detection components are respectively arranged on a plurality of to-be-detected suspension sensors, and each of the plurality of detection components communicates with the controller.

6. The system for detecting a suspension system of a maglev train according to claim 1, wherein the housing comprises a housing portion corresponding to a detection surface of the to-be-detected suspension sensor, a length direction of a coil of the first test coil group is the same as a width direction of the housing portion, and a length direction of a coil of the second test coil group is the same as a length direction of the housing portion.

7. The system for detecting a suspension system of a maglev train according to claim 1, wherein the detection component further comprises a wireless communication module, the driving unit communicates with the controller through the wireless communication module, and the wireless communication module is built-in to the housing.

8. The system for detecting a suspension system of a maglev train according to claim 1, wherein the detection component further comprises a power supply module built-in to the housing, and the power supply module is configured to supply power to the detection component.

9. The system for detecting a suspension system of a maglev train according to claim 1, wherein the number of the detection component is more than one, and a plurality of detection components are respectively arranged on a plurality of to-be-detected suspension sensors, and each of the plurality of detection components communicates with the controller.

10. The system for detecting a suspension system of a maglev train according to claim 1, wherein
the parameter information comprises: a gap value and a speed value of the to-be-detected suspension sensor, and a current value of a to-be-detected electromagnet; and
the driving signal comprises: an energized/de-energized state, an energized/de-energized frequency, an energized/de-energized sequence, and an energized/de-energized number of coils in the first test coil unit and the second test coil unit.

\* \* \* \* \*